US00RE37233E

(19) United States
(12) Reissued Patent
Chancellor et al.

(10) Patent Number: US RE37,233 E
(45) Date of Reissued Patent: Jun. 19, 2001

(54) INTEGRAL MOTOR CENTRIFUGAL PUMP

(75) Inventors: Dennis H. Chancellor, Falls of Rough, KY (US); Temple M. Chancellor, Chandler, AZ (US); Jacquetta Vogel, Falls of Rough, KY (US)

(73) Assignee: Nate International, Woodland Hills, CA (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/605,747

(22) Filed: Feb. 22, 1996

Related U.S. Patent Documents

Reissue of:
(64) Patent No.: 5,288,215
Issued: Feb. 22, 1994
Appl. No.: 07/978,722
Filed: Nov. 19, 1992

(51) Int. Cl.[7] ..... F04B 17/00
(52) U.S. Cl. ..... 417/423.7; 417/423.11; 417/423.12; 417/423.14
(58) Field of Search ..... 417/355, 356, 417/423.1, 423.7, 423.8, 423.11, 423.12, 423.13, 423.14, 422; 415/118, 201, 206; 416/61

(56) References Cited

U.S. PATENT DOCUMENTS 1,363,315 * 12/1920 Dron ..... 417/422
1,687,658 * 10/1928 Conant .
1,714,484 * 5/1929 Johnson .
2,139,379 * 12/1938 Myers .
3,134,333 * 5/1964 Nielsen .
3,667,870 * 6/1972 Yoshida et al. .
4,569,638 * 2/1986 Harker et al. .
4,773,822 * 9/1988 Jensen et al. .
4,773,823 * 9/1988 Pease .
4,959,183 * 9/1990 Jameson .
5,112,202 * 5/1992 Oshima et al. ..... 417/356

FOREIGN PATENT DOCUMENTS

733312 * 5/1966 (CA) .
343016 * 1/1960 (CH) ..... 417/356
1059329 * 4/1954 (FR) .
0072270 * 6/1981 (JP) ..... 417/356
72270 * 6/1981 (JP) ..... 417/356

* cited by examiner

*Primary Examiner*—Charles G. Freay
(74) *Attorney, Agent, or Firm*—Robert D. Fish; Fish & Associates, LLP

(57) ABSTRACT

A new integral motor/pump design utilizing a combination centrifugal enclosed impeller, shaft and feeder conduit. Whereby the impeller drive shaft serves a dual purpose of providing applied power from the hollow motor driveshaft directly to the impeller blade or blades and also is a fluid entrance conduit for the impeller media feed. The present invention hollow motor drive shaft, hollow impeller shaft and enclosed impeller also incorporates optional changeable impeller leading edge blades. These blades help facilitate the most efficient flow of various fluids and pumped media. The present invention utilizes simplicity of design whereby inspection and service accessibility is optimized. Design configuration renders radial thrust bearing curves more applicable to a broad range of applications and extended motor/pump service life.

7 Claims, 4 Drawing Sheets

INTEGRAL MOTOR CENTRIFUGAL PUMP

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to a centrifugal pump which in its conventional form comprises an impeller fitted with vanes and rotating in a closed casing. Fluid enters the casing at the center of the impeller where, due to the rotation of the impeller, the pressure of the fluid is increased and the fluid is delivered to the periphery at a high velocity. Rotation of the impeller is activated by an external electric motor shaft penetrating into the closed casing (volute) onto which the impeller is attached.

2. Description of the Related Art

U.S. Pat. No. 3,134,332, Nielson 1964, describes a conventional centrifugal pump with an electric motor driving the impeller. U.S. Pat. No. 4,773,822 Jensen et al 1988, describes the separation between the rotating impeller inlet and the volute supply inlet allowing a certain percentage of the pumped fluid to reenter the impeller suction inlet. U.S. Pat. No. 4,773,823, Pease 1988, describes the complexity of included parts in a conventional motor driven pump.

SUMMARY OF THE INVENTION

The present art of electromotive centrifugal pumping has historically required a separation between the rotating centrifugal impeller inlet and the stationary volute supply inlet. The resultant pressurized fluid effectively transits through the separation between the volute and the impeller suction inlet. The separation allows a certain percentage of the pumped media to reenter the impeller suction supply inlet. The resultant recirculation requires the application of additional electrical energy to repressurize the aforementioned recirculating media. The resultant recirculation may also wear the surfaces of either the impeller inlet and/or the volute supply inlet. This wearing process decreases the efficiency of the pump proportionally with the increased separation of the impeller inlet and the volute supply inlet. In certain pumping situations, i.e., sewage, pulp, trash pumping, etc., the recirculating media may carry suspended solids. These solids complicate the pumping process when they become wedged between the rotating impeller inlet and the stationary volute. The efficiency of the pump decreases when the wedged suspended solids causes impeller cavitation and/or friction. The wedged suspended solids could effectively disable the pump or even stop the rotation of the impeller. Damage may result to either the electromotor, the impeller or the volute intake. Depending upon the impeller, volute or pump assembly the removal of these solids from the pump could be dangerous, labor intensive or expensive.

Furthermore, electromotive centrifugal pumping has encumbered design configurations of the drive motor to be an external appendage in relation to the impeller and volute. Centrifugal pump impellers are usually driven by the electromotor shaft or pump bearing and alignment shaft intruding into the volute cavity. The impeller is usually tapped and screwed to the shaft or bolted on the shaft in some fashion. This and similar design configurations also encumber the assembly design to unnecessary parts and complexity.

It is an objective of this invention to provide an improved electromotive pump and impeller assembly. It is a more particular objective to provide in a centrifugal pump a unique means of preventing the inherent recirculation an associated problems of conventional pump assemblies. The present invention in the proposed configuration eliminates a number of parts, tooling processes and associated manufacturing cost. A reduction in the number of unnecessary component parts effectively reduces the complexity, weight and size of the invention. Therefore, the necessary manufacturing, assembly and service procedures are effectively reduced. For clarification, the improvements encompass a combined rotating impeller intake -and power transmitting shaft integral with a new totally sealed water design. The hollow impeller shaft serves the dual purpose of transmitting motor rotational power to the enclosed impeller blades and serves as the impeller fluid intake conduit. This arrangement effectively eliminates the necessity of a volute intake, adjustable impeller/volute clearance tolerances and the industry standard wearing rings for enclosed impeller pumps. This present invention efficiently transmits the motor power directly to the impeller blades. This configuration completely eliminates the inherent recirculation problems associated with conventional present art centrifugal pumps. It also enhances the radial thrust bearing curve thereby dramatically increasing service life and range of the pump and impeller applications. This arrangement implements a new ease of impeller access for inspection purposes and new ease of changing the impeller unit. This present invention incorporates optional changeable impeller leading edge blades.

DETAILED DESCRIPTION OF THE PREFERRED EMBODIMENTS

Figure 1:
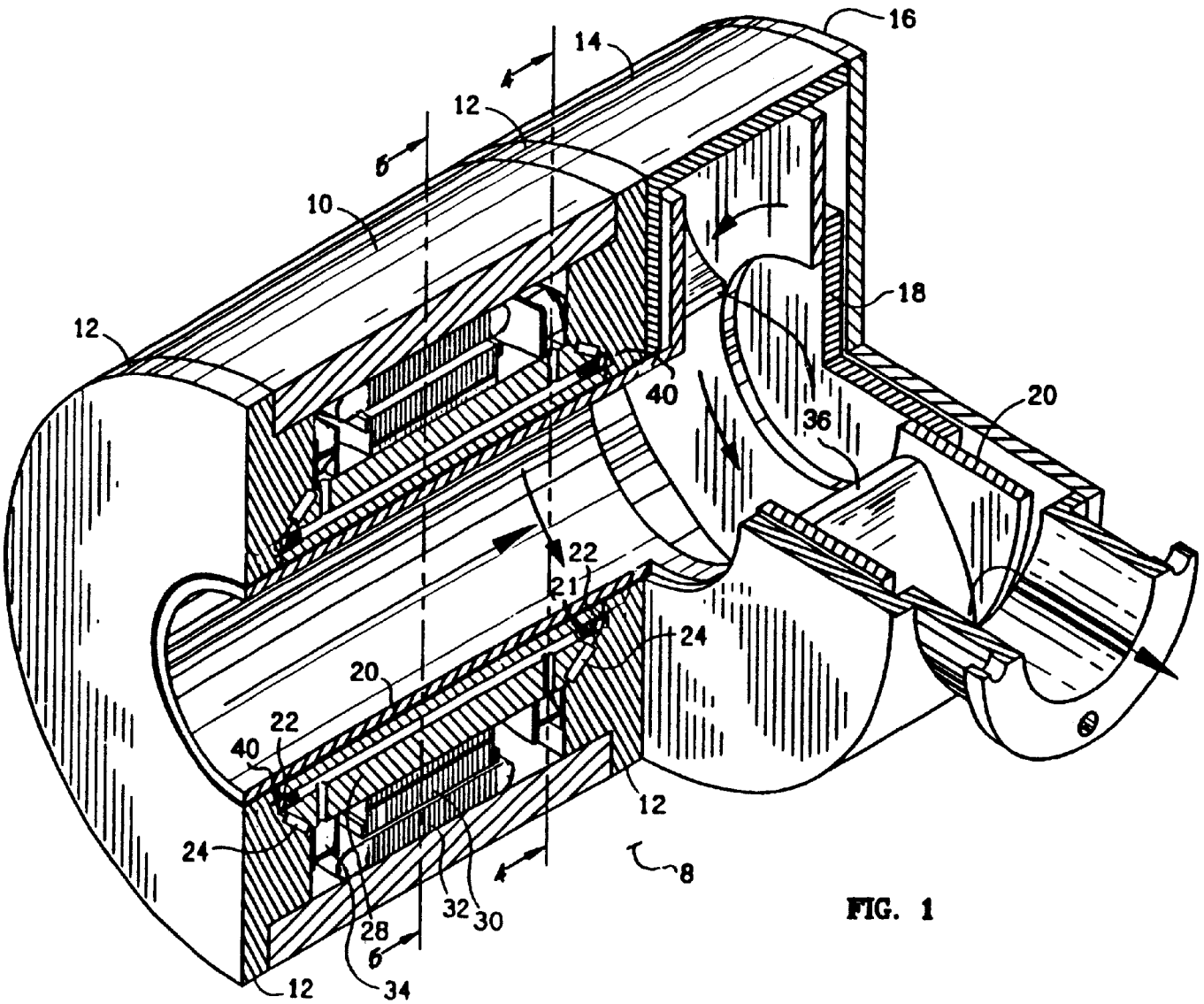
FIG. 1 is a perspective view of the integral motor/pump of the present invention.

An integral motor/pump according to the present invention is shown generally by reference numeral 8 in FIG. 1. The pump comprises a main motor housing 10 and two motor endplates 12. The pump volute 14 is attached in an appropriate manner to one of the motor endplates 12. A removable volute inspection endplate 16 is attached to the volute 14. The impeller 20 that rotates inside of volute 14 has a removable impeller inspection end plate 18 attached to its outmost blade enclosure plate. Roller bearings 24 are held in place by recessed seats in the endplates 12 and the motor shaft 28.

Motor housing 10 secures electromagnet 32. The electromagnet 32 being powered by an outside voltage and current source creates a rotating electromagnetic field. The rotating electromagnetic field induces a current and electromagnetic force in rotor 30. The rotor is secured and stabilized by the hollow motor shaft 28. The motor shaft is supported and stabilized by bearings 24 mounted on each end. The motor is sealed by floating mechanical seals 22 recessed into each end of the motor shaft 28. A stationary seal 40 is recessed into each motor endplate and the floating seal 22 is pressed against the stationary seal 40 by springs 21 mounted inside shaft 28. Spring 21 exerts sealing pressure for the floating mechanical seal 22. The hollow impeller shaft 20 is inserted into and rotated by the hollow motor shaft 28. Internal coolant oil impeller blades 34 are mounted on opposite ends of motor shaft 28 in reverse direction of each other. The coolant oil impeller blades are used to move motor cooling oil through the heat exchange traverse conduits 38 of the motor shaft 28.

Figure 2:
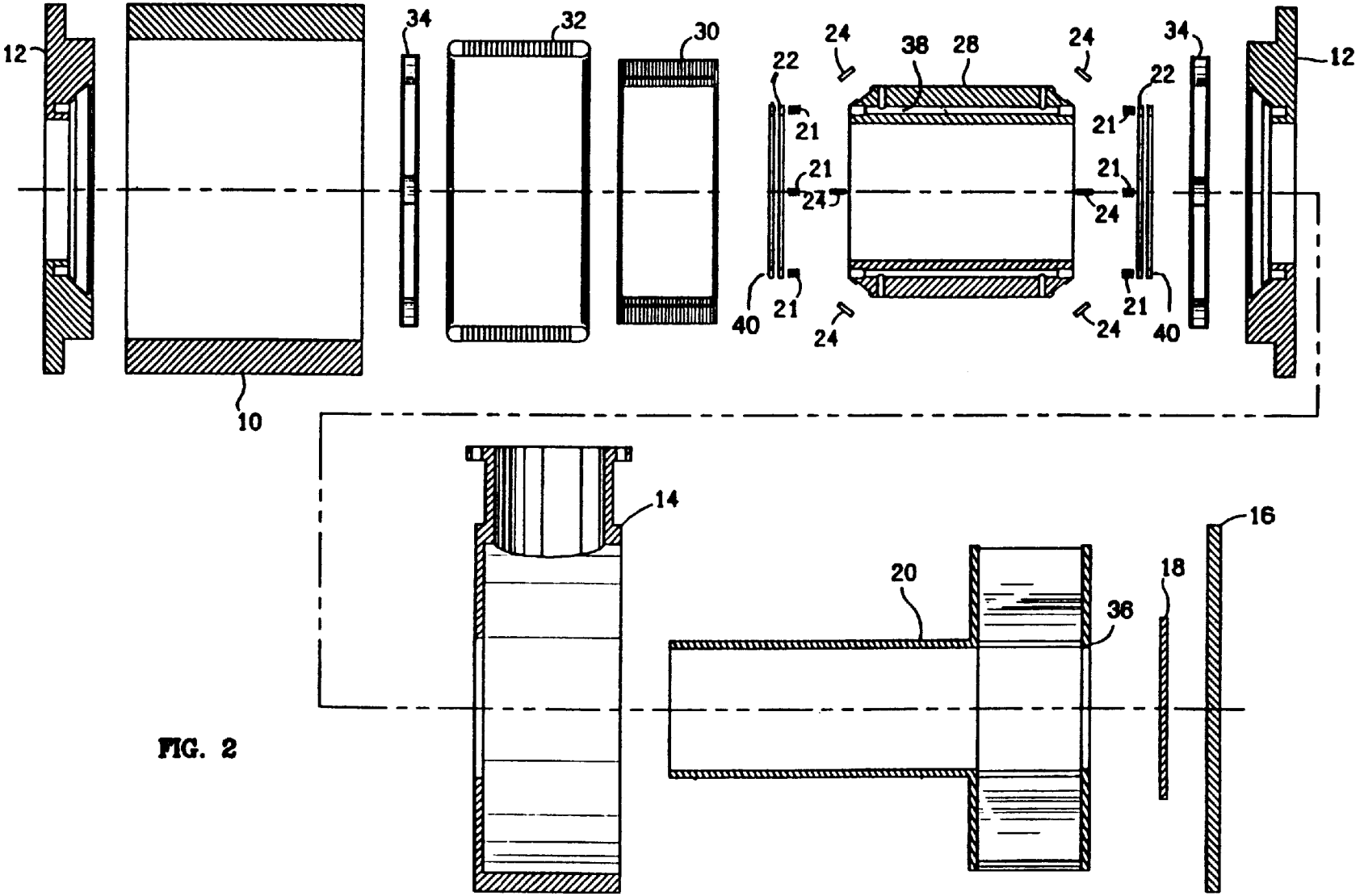
FIG. 2 is an exploded view of the integral motor/pump of the present invention.
Figure 3:
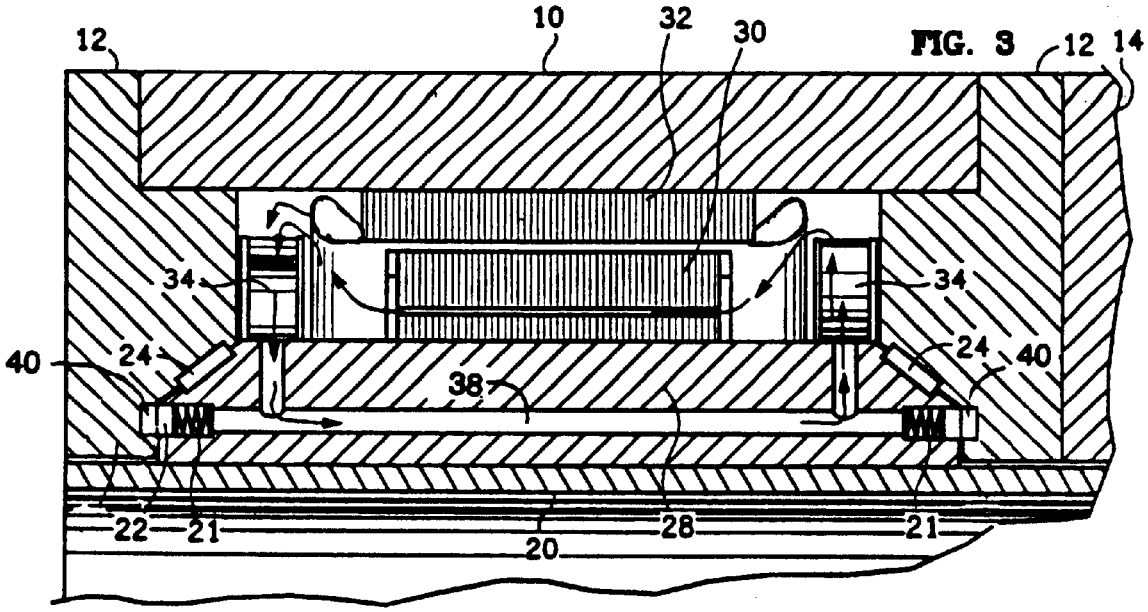
FIG. 3 is an expanded detail of the basic integral motor/pump components of the present invention.
Figure 4:
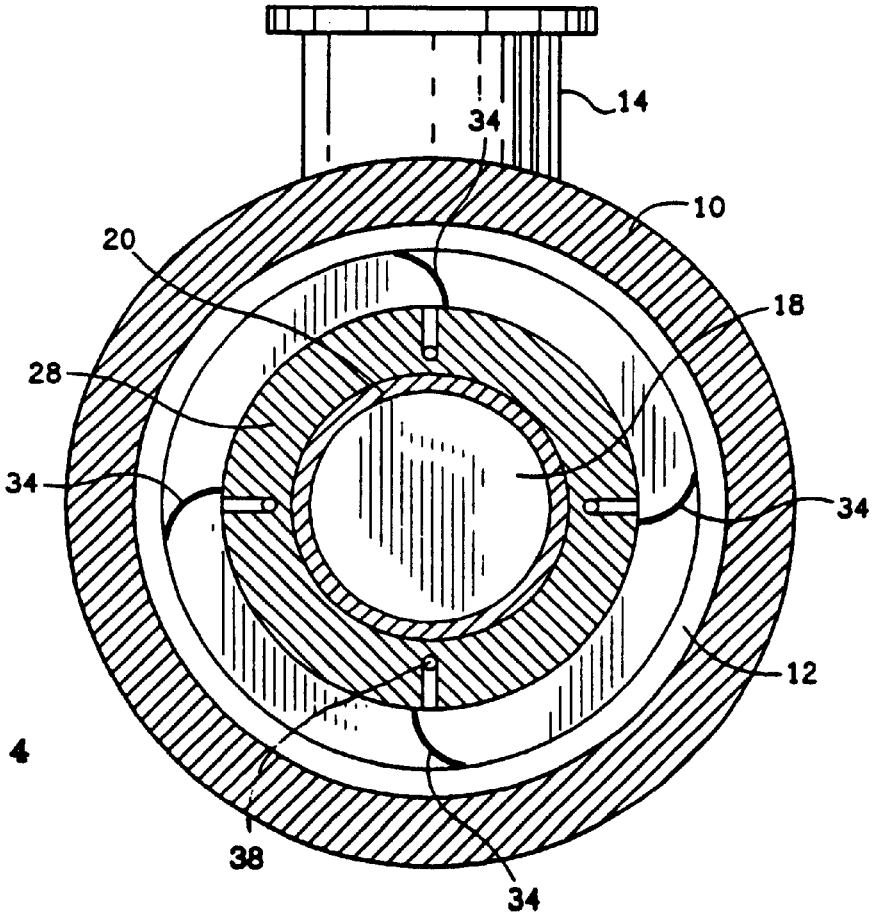
FIG. 4 is a cross section including the internal motor body oil coolant impeller.
Figure 5:
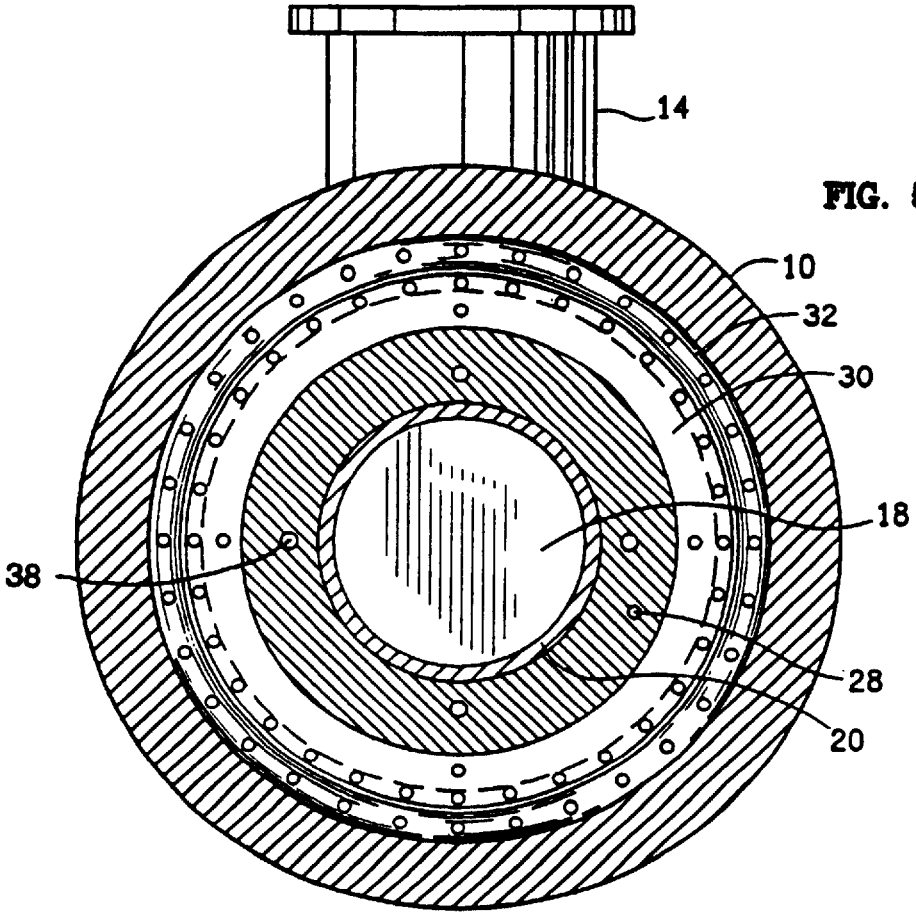
FIG. 5 is a cross section through the electromagnet and rotor section.
Figure 6:
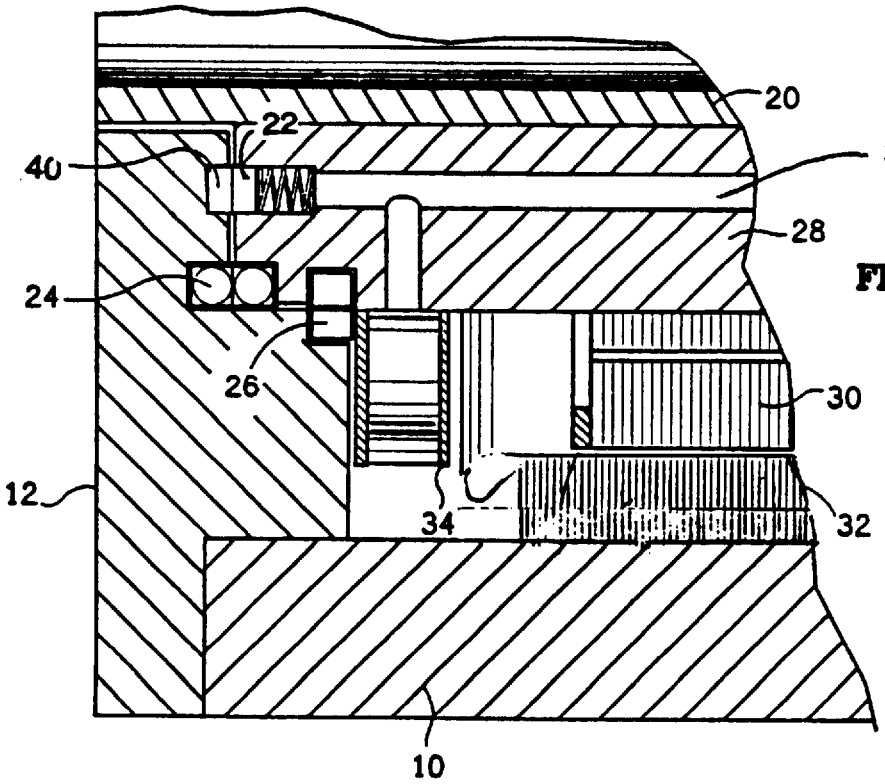
FIG. 6 is an expanded detail of an alternate bearing arrangement.

Optional replaceable impeller leading edge blades 36 are noted in FIG. 2. FIG. 6 shows an alternate bearing arrangement whereby bearing 24 is a double stacked thrust ball bearing. Bearing 26 is double stacked roller bearing used for shaft 28 alignment.

To summarize, the present invention is an electric integral motor/pump which is simple, clean and efficient to operate. The motor pump is especially well suited for many centrifugal pump applications. Although the present invention has been described with reference to preferred embodiments, workers skilled in the art will recognize that changes may be made in form and detail without departing from the spirit and scope of the invention.

What I claim is:

1. A motor driven centrifugal pump comprising:

(a) [an oil cooled motor comprising] a hollow motor shaft, a motor enclosure, [a top motor end plate and a bottom motor end plate] *and two motor endplates*;

(b) a hollow impeller shaft concentric within and coupled to said hollow motor shaft;

(c) said hollow impeller shaft [having a top end which extends] *extending* beyond said motor enclosure, past [said top motor end plate] *one of the motor end plates*;

(d) [top] *lubricated* axial bearings located in [said top motor end plate] *each of the motor end plates and* supporting said hollow motor shaft;

[(e) bottom axial bearings located in said bottom motor end plate supporting said hollow motor shaft;]

([f] *e*) a [cylindrical volute casing enclosing the impeller said casing mounted on top of said motor end plate] *volute casing enclosing an impeller connected to the impeller shaft, said impeller having a top*;

([g] *f*) a removable impeller inspection end plate attached to the top of said impeller;

[(h) said axial bearings being oil lubricated;]

([i] *g*) oil lubricated mechanical sealing means located on the interface of the hollow motor shaft and the motor end plates for sealing said motor; *and*

([j] *h*) a removable volute inspection plate attached to the top of the volute casing.

2. A motor driven centrifugal pump as described in claim 1 and further comprising:

(a) two oil circulating impellers mounted on the hollow motor shaft.

*3. A centrifugal pump comprising:*

*a stator;*

*a hollow rotating shaft through which a pumpate flows, the shaft operating an impeller which pumps the pumpate, said impeller having a top;*

*a removable impeller inspection plate attached to the top of the impeller;*

*at least two bearings which support the rotating shaft relative to the stator; and*

*at least two mechanical seals sealing the rotating shaft such that the pumpate is substantially kept from contacting the at least two bearings.*

*4. The centrifugal pump of claim 3 further comprising a volute disposed about the impeller, and a volute inspection plate attached to the volute.*

*5. The centrifugal pump of claim 3 further comprising a rotor concentric with the rotating shaft.*

*6. A centrifugal pump comprising:*

*a shaft defining an internal channel through which a fluid can flow, the shaft operating an impeller which pumps the pumpate, said impeller having a top;*

*a removable impeller inspection plate attached to the top of the impeller;*

*a motor having a stator and a rotor, the rotor concentric with and coupled to the shaft;*

*first and second bearings positioned about the shaft on opposite sides of the rotor; and*

*first and second seals positioned about the shaft to form a substantially fluid tight barrier between the fluid and the bearings.*

*7. The centrifugal pump of claim 6 further comprising a volute disposed about the impeller, and a volute inspection plate attached to the volute.*

* * * * *